(12) United States Patent
Kum et al.

(10) Patent No.: US 10,281,781 B2
(45) Date of Patent: May 7, 2019

(54) DISPLAY DEVICE AND METHOD FOR MANUFACTURING THE SAME

(71) Applicant: Samsung Display Co. Ltd., Yongin-si, Gyeonggi-do (KR)

(72) Inventors: Byung Gon Kum, Suwon-si (KR); Seong Gyu Kwon, Suwon-si (KR); Sang Il Kim, Yongin-si (KR); Tae Woo Lim, Yongin-si (KR); Sang Gil Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/483,071

(22) Filed: Apr. 10, 2017

(65) Prior Publication Data

US 2017/0363921 A1 Dec. 21, 2017

(30) Foreign Application Priority Data

Jun. 16, 2016 (KR) .................. 10-2016-0075200

(51) Int. Cl.
*G02F 1/1362* (2006.01)
*G02F 1/1333* (2006.01)
*G02F 1/1343* (2006.01)

(52) U.S. Cl.
CPC .. *G02F 1/136204* (2013.01); *G02F 1/133345* (2013.01); *G02F 1/134309* (2013.01); *G02F 1/136209* (2013.01); *G02F 1/136286* (2013.01); *G02F 2001/133388* (2013.01); *G02F 2001/136295* (2013.01); *G02F 2201/121* (2013.01); *G02F 2201/123* (2013.01); *G09G 2300/0426* (2013.01); *G09G 2310/0281* (2013.01)

(58) Field of Classification Search
CPC ......... G02F 1/136204; G02F 1/136286; G02F 1/1345; G02F 1/13452; G02F 1/133377; G02F 2001/133388; G02F 2202/22; G09G 2300/0426; G09G 2310/0281
See application file for complete search history.

(56) References Cited

U.S. PATENT DOCUMENTS

| | | | |
|---|---|---|---|
| 8,310,609 B2 | 11/2012 | Yoshida et al. | |
| 2007/0194317 A1* | 8/2007 | Lim ................. | G02F 1/136204 257/72 |
| 2011/0234932 A1* | 9/2011 | Jung ................. | G02F 1/13452 349/40 |

(Continued)

FOREIGN PATENT DOCUMENTS

| KR | 1020080044579 A | 5/2008 |
|---|---|---|
| KR | 1020100036946 A | 4/2010 |

(Continued)

*Primary Examiner* — Angela K Davison
(74) *Attorney, Agent, or Firm* — Cantor Colburn LLP

(57) ABSTRACT

A display device includes a first substrate including a display area and a non-display area which is outside the display area; a first gate signal line and a second gate signal line each on the non-display area of the first substrate; a connection electrode which is on the non-display area of the first substrate and connects the first gate signal line and the second gate signal line to each other; and a static electricity prevention pattern which is on the non-display area of the first substrate and on the connection electrode.

18 Claims, 14 Drawing Sheets

(56) References Cited

U.S. PATENT DOCUMENTS

| | | | |
|---|---|---|---|
| 2014/0055440 A1* | 2/2014 | Cho | G09G 3/36 |
| | | | 345/212 |
| 2014/0132896 A1 | 5/2014 | Choi et al. | |
| 2016/0091749 A1 | 3/2016 | Kum et al. | |
| 2016/0282690 A1 | 9/2016 | Hong et al. | |
| 2017/0219892 A1* | 8/2017 | Chen | G02F 1/133512 |

FOREIGN PATENT DOCUMENTS

| KR | 1020140061935 A | 5/2014 |
|---|---|---|
| KR | 1020160116137 A | 10/2016 |

* cited by examiner

DISPLAY DEVICE AND METHOD FOR MANUFACTURING THE SAME

This application claims priority to Korean Patent Application No. 10-2016-0075200, filed on Jun. 16, 2016, and all the benefits accruing therefrom under 35 U.S.C. § 119, the content of which in its entirety is herein incorporated by reference.

BACKGROUND

1. Field

The invention relates to a display device and a method for manufacturing the same.

2. Description of the Related Art

A liquid crystal display is one of display devices that have been most widely used. The liquid crystal display is a display device that can adjust the quantity of penetrating light therethrough by applying a voltage to two electrodes (a pixel electrode and a common electrode) opposing each other and controlling an arrangement of liquid crystal molecules of a liquid crystal layer interposed between the two electrodes.

Typically, a liquid crystal display has been manufactured to include two substrates and a liquid crystal layer therebetween. However, in order to simplify the manufacturing process thereof, the liquid crystal display has been manufactured to include only one substrate and a liquid crystal layer.

SUMMARY

One or more embodiment according to the invention provides a display device which can reduce or effectively prevent display inferiority from occurring due to an influence of static electricity on a signal that is provided along a signal line.

Additional advantages, subjects and features of the invention will be set forth in part in the description which follows and in part will become apparent to those having ordinary skill in the art upon examination of the following or may be learned from practice of the embodiments.

In an embodiment, there is provided a display device, which includes a first substrate including a display area and a non-display area which is outside the display area; a first gate signal line and a second gate signal line each on the non-display area of the first substrate; a connection electrode which is on the non-display area of the first substrate and connects the first gate signal line and the second gate signal line to each other; and a static electricity prevention pattern which is on the non-display area of the first substrate and on the connection electrode.

The first gate signal line and the second gate signal line may be in different layers.

The display device may further include a first interlayer insulating layer between the first gate signal line and the second gate signal line, and a second interlayer insulating layer on the second gate signal line.

The display device may further include a first contact hole which penetrates the first interlayer insulating layer and the second interlayer insulating layer to expose the first gate signal line; and a second contact hole which penetrates the second interlayer insulating layer to expose the second gate signal line. A first end of the connection electrode may contact the first gate signal line at the first contact hole, and a second end of the connection electrode opposite to the first end thereof may contact the second gate signal line at the second contact hole.

The static electricity prevention pattern may include a first metal pattern including an upper portion, a lower portion below and spaced apart from the upper portion in a thickness direction of the first substrate by a predetermined distance, and a side portion connecting the upper portion and the lower portion to each other.

The static electricity prevention pattern may be provided in plurality. The lower portion of a first static electricity prevention pattern may contact the lower portion of a second static electricity prevention pattern adjacent to the first static electricity prevention pattern.

A predetermined space may be formed between the upper portion and the lower portion of the first metal pattern.

The display device may further include an encapsulation layer on the static electricity prevention pattern. The encapsulation layer may fill the predetermined space.

The display area of the first substrate may include a pixel electrode, a common electrode which is on the pixel electrode forms an electric field therewith, and an encapsulation layer on the common electrode. The first metal pattern may include a same material as the common electrode.

The non-display area of the first substrate may further include a black matrix at an edge of the non-display area, and a metal layer arranged on the black matrix. The metal layer may include a same material as the first metal pattern.

The static electricity prevention pattern may be provided in plurality and include first metal patterns spaced apart from each other by a predetermined distance in a top plan view.

The plurality of static electricity prevention patterns may further include a second metal pattern between the first metal patterns in the top plan view, the second metal pattern insulated from the first metal pattern.

The second metal pattern may overlap the connection electrode.

In an embodiment, there is provided a method for manufacturing a display device, including: preparing a first substrate including a display area and a non-display area, the non-display area of the first substrate including a first gate signal line, a first interlayer insulating layer on the first gate signal line, a second gate signal line on the first interlayer insulating layer, and a second interlayer insulating layer on the second gate signal line; forming on the non-display area of the first substrate, a connection electrode which connects the first gate signal line and the second gate signal line to each other; and forming on the non-display area of the first substrate, a static electricity prevention pattern on the connection electrode and the second interlayer insulating layer.

According to one or more embodiment of the embodiment, at least the following effects can be achieved.

In the non-display area of the display device, undesirable influence of static electricity on the signal line in the non-display area may be reduced or effectively prevented.

The effects according to the embodiments are not limited to the contents as exemplified above, but more various effects are described in the specification of the invention.

BRIEF DESCRIPTION OF THE DRAWINGS

The above and other objects, features and advantages of the invention will be more apparent from the following detailed description taken in conjunction with the accompanying drawings, in which:

FIG. 5b is a cross sectional view taken along line II-IF of FIG. 5a;

FIG. 6b is a cross sectional view taken along line of FIG. 6a;

DETAILED DESCRIPTION

Figure 1:
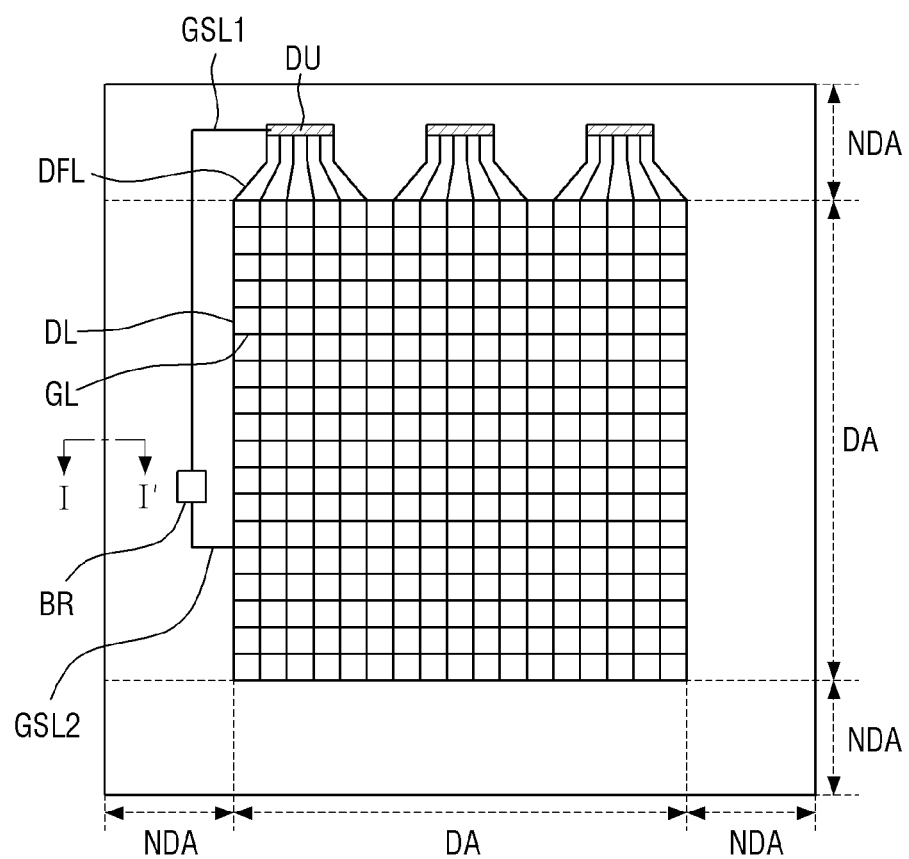
FIG. 1 is a schematic top plan view of an embodiment of a display device according to the invention.

The features of the invention and methods for achieving the features will be apparent by referring to the embodiments to be described in detail with reference to the accompanying drawings. However, the invention is not limited to the embodiments disclosed hereinafter, but can be implemented in diverse forms. The matters defined in the description, such as the detailed construction and elements, are nothing but specific detail s provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or still another element. In contrast, when an element is referred to as being "directly on" another element, there are no intervening elements present. In the entire description of the invention, the same drawing reference numerals are use d for the same elements across various figures. As used herein, the term "connect" may be used to describe a physical, electrical and/or fluid connection.

Although the terms "first," "second" and so forth are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

As an example of a display device, a liquid crystal display having only one base substrate has been manufactured in a manner that a sacrificial layer and a loop layer are formed on the one base substrate, the formed sacrificial layer is removed to define a micro-space layer, and an alignment material and liquid crystals are injected into the micro-space layer that is formed due to the removal of the sacrificial layer.

Figure 2:
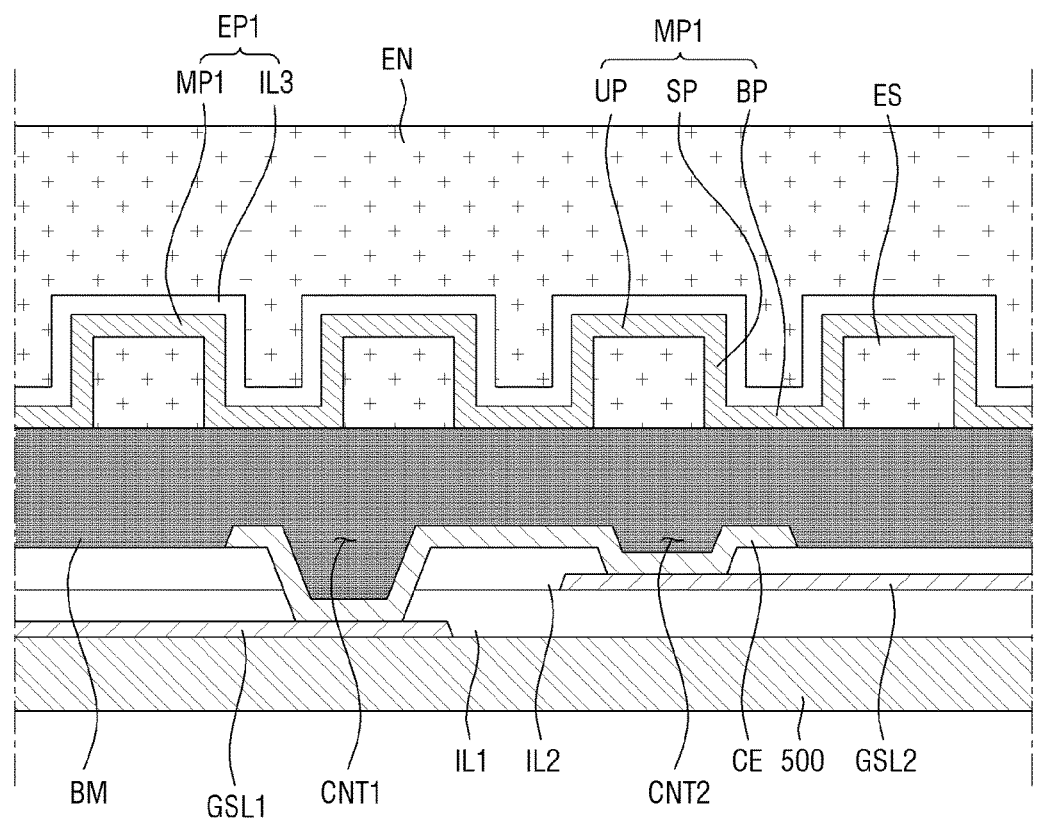
FIG. 2 is a cross-sectional view of an embodiment of a portion of the display device of FIG. 1.
Figure 3:
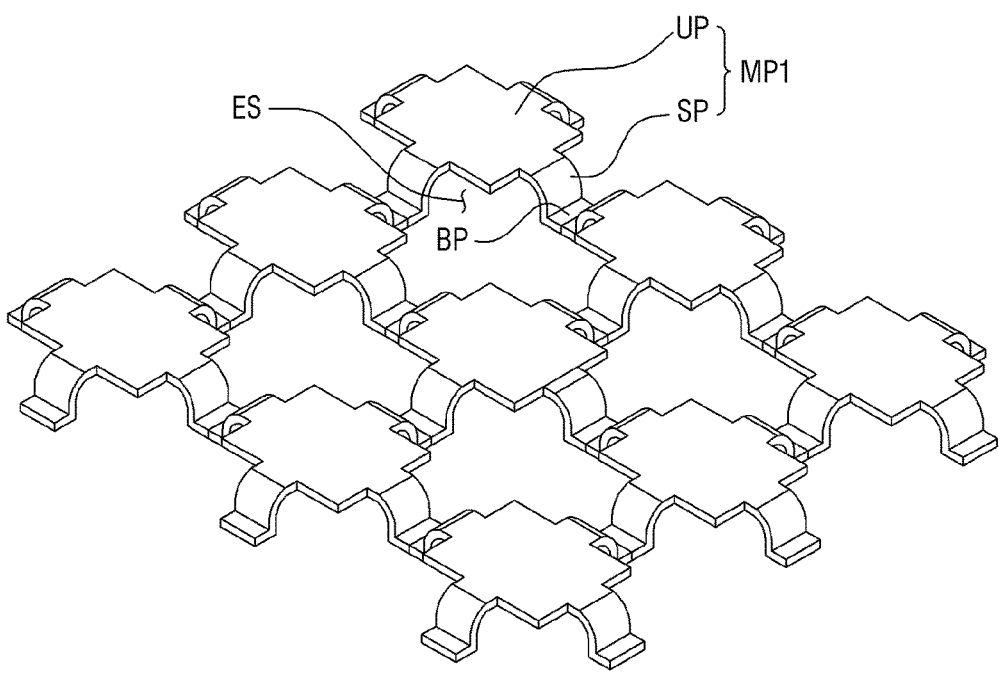
FIG. 3 is a partially enlarged perspective view of an embodiment of the display device of FIG. 2.
Figure 4:
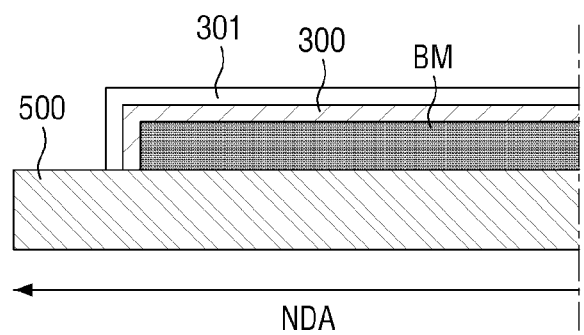
FIG. 4 is a cross-sectional view taken along line I-I' of FIG. 1.

FIG. 1 is a schematic top plan view of an embodiment of a display device according to the invention. FIG. 2 is a cross-sectional view of an embodiment of a portion of the display device of FIG. 1, and FIG. 3 is a partially enlarged perspective view of an embodiment of the display device of FIG. 2. FIG. 4 is a cross-sectional view taken along line I-I' of FIG. 1.

Referring to FIGS. 1 to 4, an embodiment of a display device according to the invention includes a first (base) substrate 500 including a display area DA and a non-display area NDA which is arranged on an outside of the display area DA, a first gate signal line GSL1 and a second gate signal line GSL2 respectively arranged on the first substrate 500 in the non-display area NDA thereof, a connection electrode CE configured to connect the first gate signal line GSL1 and the second gate signal line GSL2 to each other, and a static electricity prevention pattern arranged on the connection electrode CE.

First, referring to FIG. 1, the first substrate 500 may include or be formed of a material having heat-resistance and permeability. The first substrate 500 may include or be formed of, for example, transparent glass or plastic, but is not limited thereto. The display area DA and the non-display area NDA may be defined on the first substrate 500 and together may define an entire planar area of the first substrate 500.

The display area DA is an area at which an image is displayed in the display device, and the non-display area NDA is an area at which various kinds of signal lines are arranged so that the image can be displayed on the display area DA.

At the non-display area NDA, a drive unit DU is disposed in plurality for providing a data signal to a data line DL and/or gate line GL in the display area DA, a data fan-out line DFL is disposed in plurality for transferring signals that are provided from the drive units DU to the data line DL in the display area DA, and the first and second gate signal lines GSL1 and GSL2 for transferring signals that are provided from the drive units DU to the gate line GL in the display area DA, may be arranged. In FIG. 1, it is exemplified that the signal transferred to the data line DL and the signal transferred to the gate line GL are provided from a same or common drive unit DU, but is not limited thereto. That is, in another embodiment, separate drive units that are independently arranged may independently provide signals to the data line DL and the gate line GL.

In an embodiment, the first gate signal line GSL1 and the second gate signal line GSL2 may be arranged in different layers among layers disposed on the first substrate 500. In other words, the first gate signal line GSL1 and the second gate signal line GSL2 may have different levels.

A bridge BR may be disposed to connect the first gate signal line GSL1 and the second gate signal line GSL2, which are arranged in different layers, to each other. The bridge BR may connect the first gate signal line GLS1 and the second gate signal line GSL2 to each other.

The detailed explanation thereof will be made with reference to FIG. 2.

The display area DA will be described in more detail. A pixel (not shown) may be provided in plurality within the display area DA. In an embodiment, the pixels arranged in the display area DA may be partitioned or defined by the data line DL provided in plurality and the gate line GL provided in plurality to cross the data lines DL, but are not limited thereto.

In the display area DA, the gate line GL may define a length thereof which extends in a first direction. The first direction may be, for example, a horizontal direction in FIG. 1. For each pixel, a gate electrode (not illustrated) that is branched from the gate line GL may be arranged for each pixel.

The gate line GL may include at least one of an aluminum (Al)-based metal including an aluminum alloy, a silver (Ag)-based metal including a silver alloy, a copper to (Cu)-based metal including a copper alloy, a molybdenum (Mo)-based metal including a molybdenum alloy, chrome (Cr), titanium (Ti), and tantalum (Ta). However, this is merely exemplary, and the material of the gate line GL is not limited thereto. In order to implement a desired display device, a metal or polymer material having a required performance may be used as the material of the gate line GL.

A first interlayer insulating layer IL1 may be arranged on the gate line GL, to dispose the gate line GL between the first substrate 500 and the first interlayer insulating layer IL1. The first interlayer insulating layer IL1 may cover the gate line GL, and may be disposed or formed on the whole surface of the first substrate 500. The first interlayer insulating layer IL1 may include or be formed by combining any one or more materials selected from an inorganic insulating material, such as silicon oxide (SiOx) or silicon nitride (SiNx), benzocyclobutene ("BCB"), an acrylic material, and an organic insulating material, such as polyimide.

The data line DL may be arranged on the first interlayer insulating layer IL1. The data line DL may define a length thereof which extends in a second direction crossing the first direction, in the display area DA. The second direction may be, for example, a vertical direction in FIG. 1.

The data line DL may have a single-layer or multilayer structure that includes or is made of nickel (Ni), cobalt (Co), titan (Ti), silver (Ag), copper (Cu), molybdenum (Mo), aluminum (Al), beryllium (Be), niobium (Nb), gold (Au), iron (Fe), selenium (Se), or tantalum (Ta). Further, an alloy, which is formed by including at least one element selected from titan (Ti), zirconium (Zr), tungsten (W), tantalum (Ta), niobium (Nb), platinum (Pt), hafnium (Hf), oxygen (O), and nitrogen (N) to the above-described metal, may be applied.

As described above, for one embodiment, a plurality of pixels may be defined relative to a plurality of data lines DL and a plurality of gate lines GL which cross each other. That is, the display area DA may include a plurality of pixels that are arranged in a matrix arrangement to have a plurality of columns and a plurality of rows.

FIG. 2 is a cross-sectional view of an embodiment of a portion of the display device of FIG. 1 at the bridge BR. FIG. 1 exemplifies one bridge BR arranged at the non-display area NDA. However, this is exemplary, and the number of bridges within a display device and/or a non-display area NDA is not limited thereto. That is, in an embodiment, the bridge BR may be provided in plurality to correspond to a plurality of gate signal lines or pairs thereof. Since the first and second gate signal lines GSL1 and GSL2 are disposed adjacent to each other in the vertical direction of FIG. 1, the horizontal direction in FIG. 2 may correspond to a cross-sectional view at the bridge BR along the vertical direction of FIG. 1.

Referring to FIG. 2, the first gate signal line GSL1 is arranged on the first substrate 500 in the non-display area NDA thereof.

On the first gate signal line GLS1, the first interlayer insulating layer IL1 is arranged. The first interlayer insulating layer IL1 may be substantially equal to the first interlayer insulating layer IL1 that is arranged on the display area DA. That is, in an embodiment of manufacturing a display device, the first interlayer insulating layer IL1 disposed in one of the display area DA and the non-display area NDA may extend to be disposed in the other one of the display area DA and the non-display area NDA, such that the overall first interlayer insulating layer IL1 is common to both the display area DA and the non-display area NDA.

On the first interlayer insulating layer IL1, the second gate signal line GSL2 may be arranged. The second gate signal line GSL2 is spaced apart from the first gate signal line GSL1 by a predetermined distance, and thus does not overlap the first gate signal line GSL1. FIG. 2 illustrates the second gate signal line GSL2 spaced apart from the first gate signal line GSL1 in the horizontal direction of FIG. 2.

On the second gate signal line GSL2, a second interlayer insulating layer IL2 may be arranged. The second interlayer insulating layer IL2 may be the same as the second interlayer insulating layer IL2 that is arranged on the display area DA. That is, the second interlayer insulating layer IL2 may include or be made of a same material as that of the first interlayer insulating layer IL1. Similar to that described for the first interlayer insulating layer, in an embodiment of manufacturing a display device, the second interlayer insulating layer IL2 disposed in one of the display area DA and the non-display area NDA may extend to be disposed in the other one of the display area DA and the non-display area NDA, such that the overall second interlayer insulating layer IL2 is common to both the display area DA and the non-display area NDA.

In an embodiment, the first gate signal line GSL1 may be arranged in the same layer as the gate line GL among layers disposed on the base substrate 500, and the second gate signal line GSL2 may be arranged in the same layer as the data line DL among layers disposed on the base substrate 500.

Further, in an embodiment, the first gate signal line GSL1 and the gate line GL may include or be made of a same material as each other, and the second gate signal line GSL2 and the data line DL may include or be made of a same material as each other.

In the first interlayer insulating layer IL1 and the second interlayer insulating layer IL2, a first contact hole CNT1 that penetrates the first interlayer insulating layer IL1 and the second interlayer insulating layer IL2 may be formed. The first contact hole CNT1 may expose an upper surface of the first gate signal line GSL1 at least partly.

In the second interlayer insulating layer IL2, a second contact hole CNT2 that penetrates the second interlayer insulating layer IL2 may be formed. The second contact hole CNT2 may expose an upper surface of the second gate signal line GSL2 at least partly.

On the second interlayer insulating layer IL2, the connection electrode CE may be arranged. A first end of the connection electrode CE may be arranged in and/or at the first contact hole CNT1, and a second end of the connection electrode CE opposing the first end thereof may be arranged in and/or at the second contact hole CNT2. In other words, the first end of the connection electrode CE may come in contact with the first gate signal line GSL1 at the first contact hole CNT1, and the second end thereof may come in contact with the second gate signal line GSL2 at the second contact hole CNT2.

That is, the connection electrode CE may electrically connect the first and second gate signal lines GSL1 and GSL2 to each other at the first contact hole CNT1 and the second contact hole CNT2, respectively.

In an embodiment, the connection electrode CE may include or be formed of a same material as a pixel electrode (PE in FIG. 7) that is arranged in the pixel. That is, in an embodiment of manufacturing a display device, the connection electrode CE in the non-display area NDA may be formed simultaneously with forming of the pixel electrode PE in the display area DA, such that the connection electrode CE and the pixel electrode PE are formed from a same material layer to be disposed in a same layer among layers disposed on the first substrate 500.

On the connection electrode CE and the second interlayer insulating layer IL2, a black matrix BM may be arranged. The black matrix BM may serve to intercept light that is incident from an outside the display device or to block light that is spread from inside the display device. For this, the black matrix may include or be formed of photosensitive resin that includes black pigment.

In an embodiment, the black matrix BM in the non-display area NDA may be formed to extend from the black matrix BM of the display area DA. That is, in an embodiment, the display device may be a black matrix column spacer ("BCS") type display device or a black matrix on array ("BOA") type display device in which the black matrix BM is arranged within a lower display substrate, such as within the display device including only the first substrate 500 according to the invention.

On the black matrix BM, a first static electricity prevention pattern EP1 may be arranged. The first static electricity prevention pattern EP1 may include a first metal pattern MP1 and a third interlayer insulating layer IL3.

The first metal pattern MP1 will be described in detail with reference to FIG. 3. The metal pattern MP1 may include an upper portion UP, a side portion SP, and a lower portion BP. The upper portion UP may be arranged to be spaced apart from a reference surface (upper surface of black matrix BM in FIG. 2) by a predetermined distance. The reference surface may be disposed in or parallel to a plane defined by the first and second directions. The upper portion UP may be spaced apart from the reference surface in a third direction, e.g., vertical in FIG. 2 which is taken along a thickness direction of the first substrate 500. That is, since the black matrix BM and the upper portion UP are spaced apart from each other for a predetermined distance, a predetermined space ES may be arranged between the black matrix BM and the upper portion UP.

The side portion SP may extend from an end of the upper portion UP. That is, the side portion SP may extend from the end of the upper portion UP toward the lower portion BP. That is, a first end of the side portion SP may come in contact with the upper portion UP, and a second end of the side portion SP opposite to the first end thereof may come in contact with the lower portion BP.

The third interlayer insulating layer IL3 may correspond to the shape of the first metal pattern MP1 in the top plan view. As illustrated in FIG. 2, the third interlayer insulating layer IL3 on an upper surface of the upper portion UP of the first metal pattern MP1, may extend toward the black matrix BM along an outer surface of the side portion SP and across an upper surface of the lower portion BP.

FIG. 3 exemplifies a case where the shape of the side portion SP includes a gradually curved surface in the third direction, but the shape of the side portion SP is not limited thereto. That is, the side portion SP may include at least one shape selected from a linear vertically extending flat plate shape, a linear slantingly or sloped flat plate shape, and a step shape. That is, the shape of the side portion SP that connects the upper portion UP and the lower portion BP is not limited.

The lower portion BP may come in contact with the reference surface, that is, the upper surface of the black matrix BM, such as by direct contact. For one first metal pattern MP1, a lower portion BP may be provided in plural at one or more sides of the first metal pattern MP1. As shown in FIG. 3, the first metal pattern MP1 provided in plurality may be considered as defining an overall first static electricity prevention pattern EP1 or a plurality of first static electricity prevention patterns EP1. The lower portion BP of the first static electricity prevention pattern EP1 of one first metal pattern MP1 may be connected to the first static electricity prevention pattern EP1 of an adjacently arranged first metal pattern MP1. That is, as illustrated in FIGS. 2 and 3, a plurality of first static electricity prevention patterns EP1 may be formed in a single unitary body as adjacent lower portions BP thereof are connected to each other.

Referring to FIG. 2 and FIG. 3 together, the third interlayer insulating layer IL3 on an upper surface of the upper portion UP of the first metal pattern MP1, may extend toward the black matrix BM along an outer surface of the side portions SP disposed at different sides of the upper portion UP, and further across an upper surface of the lower portion BP connected to a respective side portion SP.

Static electricity that is generated from outside a display device may undesirably exert an influence on a signal transmitted through conductive signal lines of the display device. However, in one or more embodiment where the static electricity prevention pattern is formed on the connection electrode CE, since the static electricity prevention pattern disperses the static electricity such as incident from outside the display device, the static electricity exerting an undesirable influence on the signal may be reduced or effectively prevented.

Further, the lower portion BP and the upper portion UP of the first metal pattern MP1 may not overlap each other in a top plan view of the static electricity prevention pattern.

Since the upper portion UP and the lower portion BP are spaced apart from each other in the horizontal direction (e.g., non-overlapping in a top plan view), the predetermined space ED may be arranged at the lower portion of (e.g., under) the upper portion UP. This empty space ES may be filled with an encapsulation layer EN. Spaces ES of adjacent first metal patterns MP1 may be connected to each other.

Referring again to FIG. 2, on the first static electricity prevention pattern EP1, the third interlayer insulating layer IL3 may be arranged. The third interlayer insulating layer IL3 may be formed by combining any one or more materials selected from an inorganic insulating material, such as silicon oxide (SiOx) or silicon nitride (SiNx), benzocyclobutene ("BCB"), an acrylic material, and an organic insulating material, such as polyimide.

In an embodiment, the third interlayer insulating layer IL3 may also be omitted from the static electricity prevention pattern.

On the first static electricity prevention pattern EP1, an encapsulation layer EN may be arranged. The encapsulation layer EN may include or be formed of an insulating material. In an embodiment, the encapsulation layer EN may be an encapsulation layer EN that substitutes for or functions as an upper (base) substrate of a conventional display device, such that one or more embodiment according to the invention includes only one base substrate, e.g., the first substrate 500.

The encapsulation layer EN may be arranged at the upper portion of the first static electricity prevention pattern EP1 and may fill the predetermined space ES that is arranged at the lower portion of the upper portion UP. Since the spaces ES of adjacent first metal patterns MP1 may be connected to each other, the encapsulation layer EN may fill each of the adjacent spaces ES at the same time to be common to each of the first metal patterns MP1 across the first static electricity prevention pattern EP1.

FIG. 4 is a cross-sectional view illustrating an embodiment of an edge portion of the display device, that is, an end of the non-display area NDA, according to the invention.

Referring to FIG. 4, at the end or edge of the non-display area NDA, a black matrix BM, a metal layer 300, and an insulating layer 301 may be arranged. The black matrix BM may be the same as the black matrix BM as described above with reference to FIG. 2. That is, the black matrix BM may be disposed or formed on the whole surface of the first substrate 500, starting from the display area DA and reaching the non-display area NDA.

On the black matrix BM, a metal layer 300 may be arranged. The metal layer 300 may cover the upper surface and the side surface of the black matrix BM at the end of the non-display area NDA. With respect to a distal end of the first substrate 500, the side surface of the black matrix BM may be arranged further from the distal end than a side surface of the metal layer 300. The metal layer 300 may include or be formed of a material that is substantially the same as the material of the first metal pattern MP1 of FIG. 2. That is, in an embodiment of manufacturing a display device, the metal layer 300 and the first metal pattern MP1 may be simultaneously formed in the same process, such that the metal layer 300 and the first metal pattern MP1 are formed from a same material layer to be disposed in a same layer among layers disposed on the first substrate 500. One of the metal layer 300 and the first metal pattern MP1 may extend in the non-display area to define the other one of the metal layer 300 and the first metal pattern MP1.

However, the invention is not limited to the manufacturing method as described above.

On the metal layer 300, an insulating layer 301 may be arranged. The insulating layer 301 may include or be formed of a material that is substantially the same as the material of the third interlayer insulating layer IL3 of FIG. 2. That is, in an embodiment of manufacturing a display device, the insulating layer 301 may be formed simultaneously with the third interlayer insulating layer IL3 in the same process, such that the insulating layer 301 and the third interlayer insulating layer IL3 are formed from a same material layer to be disposed in a same layer among layers disposed on the first substrate 500. One of the insulating layer 301 and the third interlayer insulating layer IL3 may extend in the non-display area to define the other one of the insulating layer 301 and the third interlayer insulating layer IL3. The insulating layer 301 may cover the upper surface and the side surface of the metal layer 301. That is, with respect to the distal end of the first substrate 500, the side surface of the metal layer 300 may be arranged further from the distal end than the side surface of the insulating layer 301. A portion of the first substrate 500 may be exposed by the side surface of the insulating layer 301 at the edge portion of the display device.

Figure 5A:
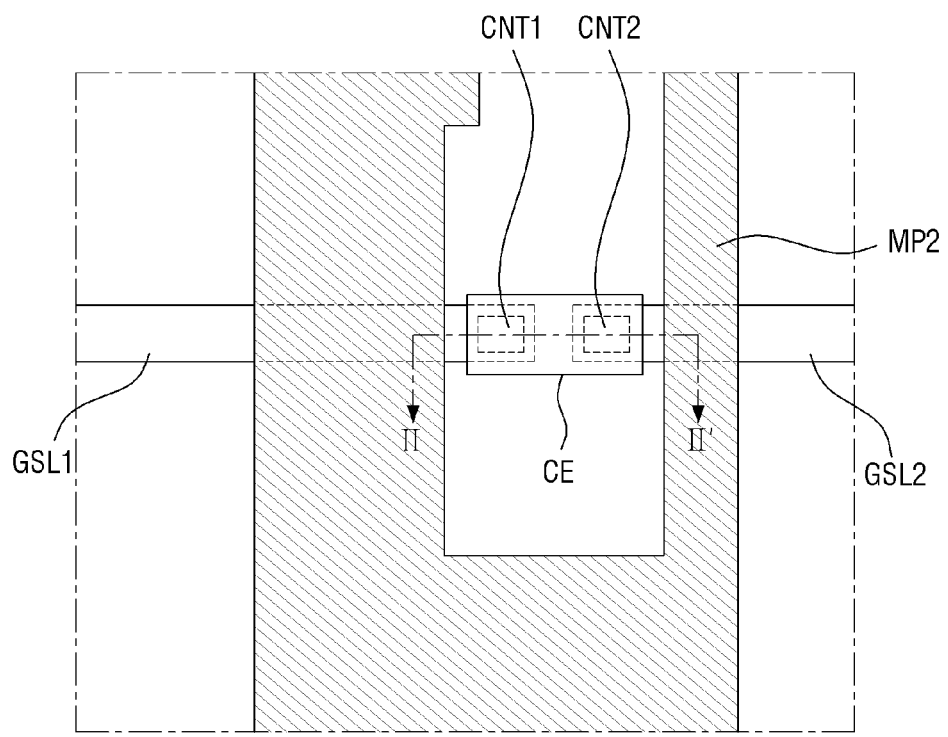
FIG. 5a is a schematic top plan view of another embodiment of a display device according to the invention.
Figure 5B:
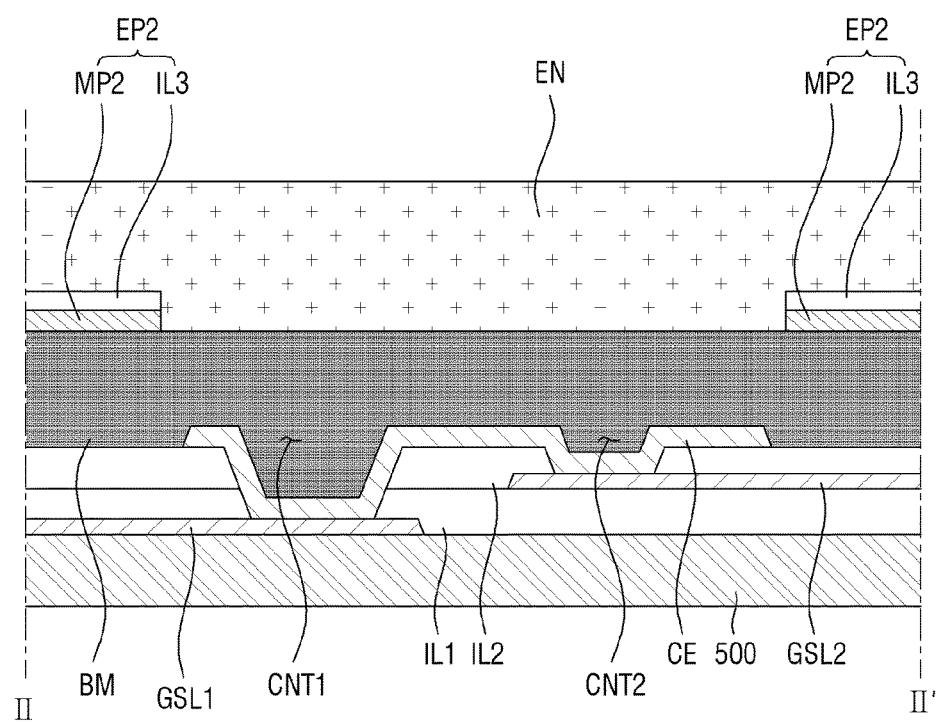

FIG. 5a is a schematic top plan view of another embodiment of a display device according to the invention and FIG. 5b is a cross sectional view taken along line II-II' of FIG. 5a. Similarly to FIG. 2, FIG. 5 is a cross-sectional view at the bridge BR of the display device of FIG. 1.

Referring to FIGS. 5a and 5b, an embodiment of a display device according to the invention is different from the display device according to the embodiment of FIG. 2 as including a second static electricity prevention pattern EP2.

The second static electricity prevention pattern EP2 may include a second metal pattern MP2 and a third interlayer insulating layer IL3. The second static electricity prevention pattern EP2 may be provided in plurality on the black matrix BM. In an embodiment, the second static electricity prevention pattern EP2 may have a plate shape, but the invention is not limited thereto.

The second metal pattern MP2 may be arranged on the black matrix BM. The second metal pattern MP2 may be provided in plurality on the black matrix BM.

Adjacent second metal patterns MP2 may be arranged to be spaced apart from each other by a predetermined distance. The black matrix BM may be exposed between second metal patterns MP2 adjacent to each other. In an embodiment, the adjacent second metal patterns MP2 may be electrically connected to each other, but is not limited there to. The second metal patterns MP2 may be insulated from each other.

That is, in an embodiment, the second metal patterns MP2 may be formed to be spaced apart from each other in cross section, but may be connected to each other in plane(as shown in FIG. 5a). FIG. 5b shows portions of adjacent second static electricity prevention patterns EP2 closest to the black matrix BM spaced apart from each other in a cross-sectional view in one planar direction (e.g., horizontal in FIG. 5b). However, in a top plan view defined by two planar directions (e.g., first and second directions), the adjacent second static electricity prevention patterns EP2 may include portions thereof which are connected to each other. In an embodiment, for example, each second metal pattern MP2 may have a structure including an upper portion furthest from the black matrix BM, a lower portion closest to the black matrix BM and a side portion which connects the upper and lower portions to each other, similar to those portions of the first metal pattern MP1 described above.

In an embodiment, the second metal pattern MP2 may be arranged not to overlap the connection electrode CE.

The second metal pattern MP2 is disposed to not overlap the connection electrode CE to reduced or effectively prevent the second metal patterns MP2 that are electrically connected to each other, from exerting an influence on the connection electrode CE.

On the second metal pattern MP2, the third interlayer insulating layer IL3 may be arranged. The third interlayer insulating layer IL3 may correspond to the shape of the second metal pattern MP2 in the top plan view. On the third interlayer insulating layer IL3, an encapsulation layer EN may be arranged. Since the third interlayer insulating layer IL3 and the encapsulation layer EN are as described above, the detailed explanation thereof will be omitted.

Figure 6A:
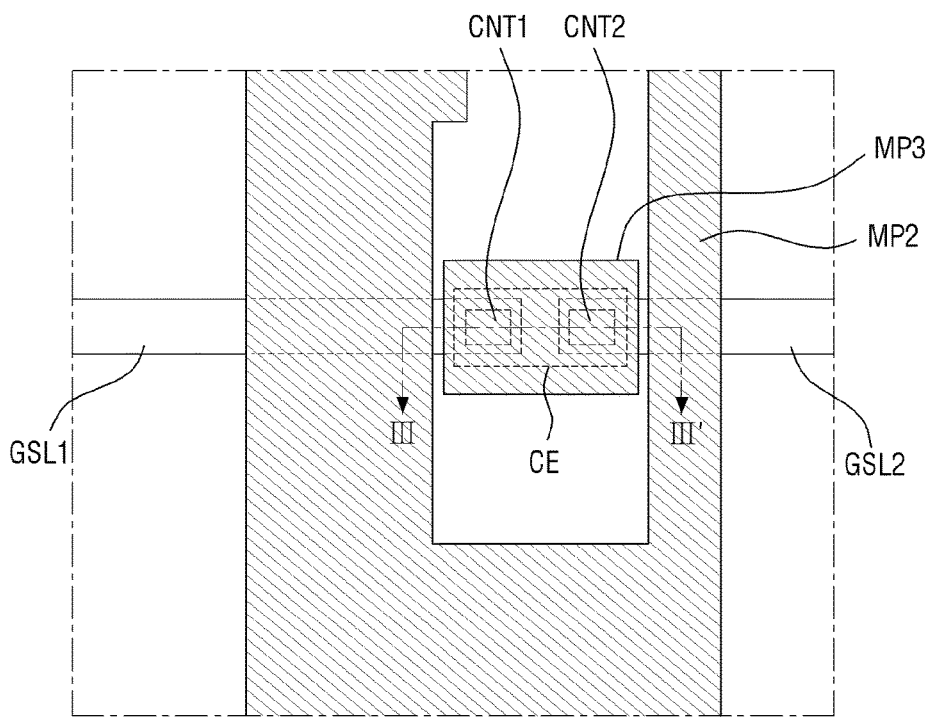
FIG. 6a is a schematic top plan view of another embodiment of a display device according to the invention.
Figure 6B:
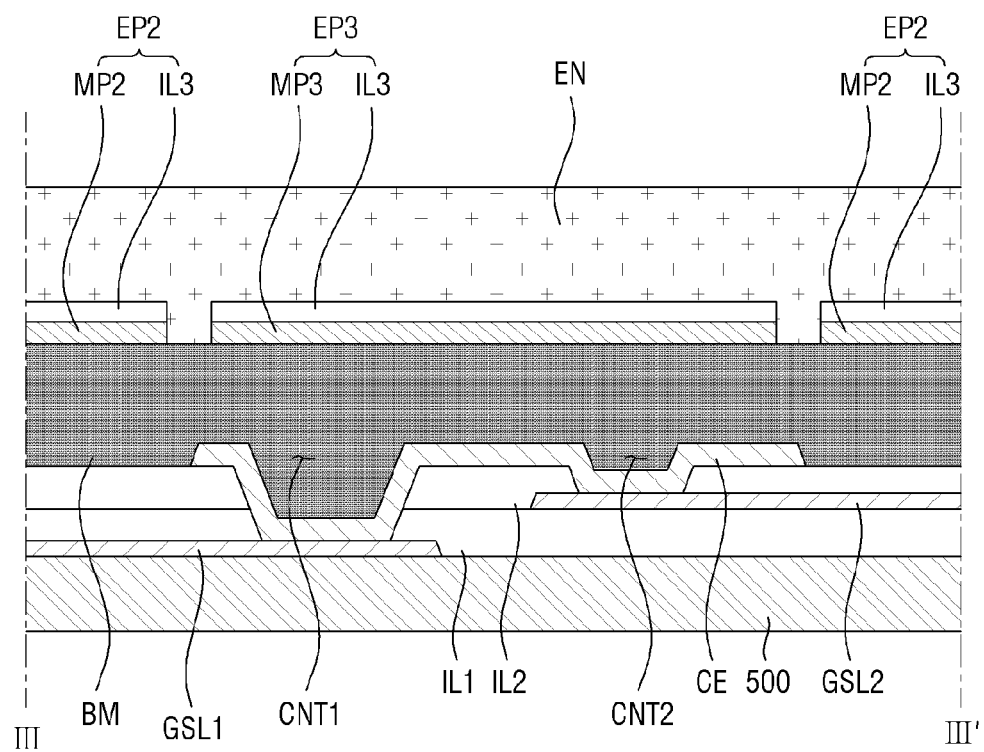

FIG. 6a is a schematic top plan view of another embodiment of a portion of a display device according to the invention. FIG. 6b is a cross sectional view taken along line of FIG. 6a. Similarly to FIG. 2, FIG. 5a and FIG. 5b, FIG. 6 is a cross-sectional view at the bridge BR of the display device of FIG. 1.

Referring to FIGS. 6a and 6b, a third static electricity prevention pattern EP3 may be further arranged between second static electricity prevention patterns EP2.

The third static electricity prevention pattern EP3 may be arranged between the second static electricity prevention patterns EP2 adjacent to each other. The third static electricity prevention pattern EP3 may be electrically insulated from the second static electricity prevention pattern EP2. That is, In an exemplary embodiment in which a plurality of second static electricity prevention patterns EP2 are electrically connected to each other, the third static electricity prevention pattern EP3 may be insulated from the second static electricity prevention patterns EP2 connected to each other. (As shown in FIG. 6a)

The third static electricity prevention pattern EP3 may be arranged to overlap the connection electrode CE. In an embodiment, the third static electricity prevention pattern EP3 may have a plate shape, but the invention is not limited thereto.

Figure 7:
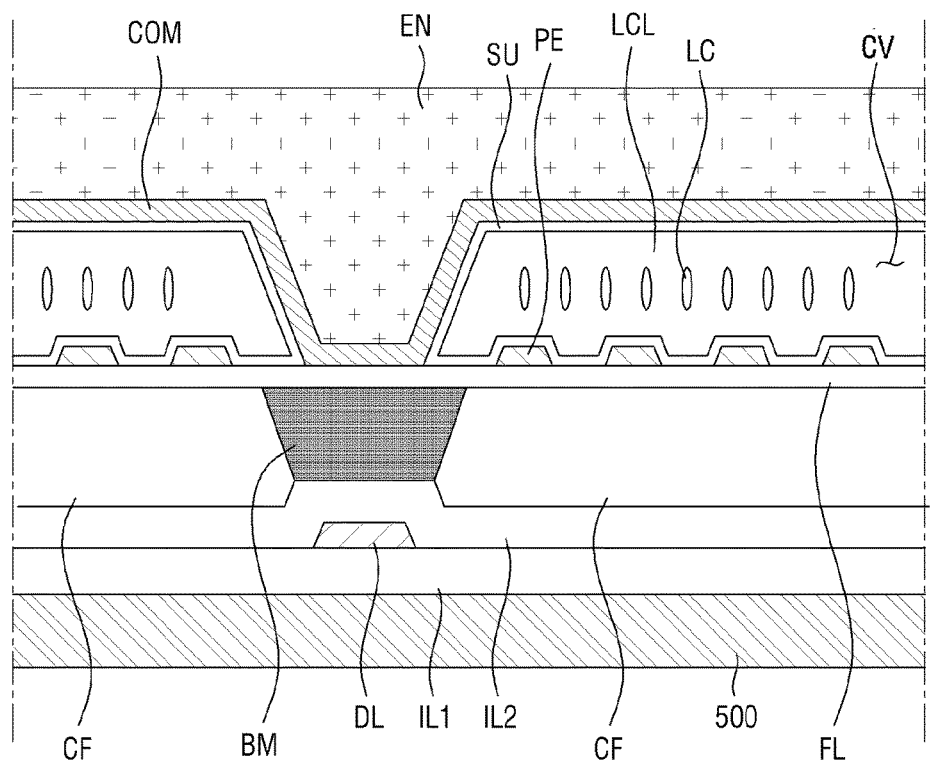
FIG. 7 is a cross-sectional view of an embodiment of a portion of a display area in a display device according to the invention.

FIG. 7 is a cross-sectional view of an embodiment of a portion of a display area DA in a display device according to the invention.

Referring to FIG. 7, an embodiment of a display device according to the invention may be a display device in which an upper substrate of a conventional display device is replaced by an encapsulation layer EN, such that the display device according to one or more embodiment of the invention includes only one substrate upon which layers of the display device are disposed.

In explanation, the first interlayer insulating layer IL1 may be arranged on the first substrate 500. As described above, the gate line GL and the gate electrode branched there from may be disposed between the first substrate 500 and the first interlayer insulating layer IL1. The first interlayer insulating layer IL1 may include or be formed of a material that is substantially the same as the material of the first interlayer insulating layer IL1, such as being formed from a same material layer, as described above with reference to FIG. 2.

On the second interlayer insulating layer IL2, a black matrix BM and a color filter CF may be arranged. That is, the embodiment of the display device according to the invention may be a display device in which the black matrix BM and the color filter CF are both disposed or formed on the lower substrate at a same side of a light transmittance layer.

The black matrix BM may define a length thereof which extends along the data line DL and/or gate line GL. As described above, the black matrix BM may be integrally formed from the display area DA to the non-display area NDA, such that the black matrix BM in one of the display area DA and the non-display area NDA, extends to be disposed in the other one of the display area DA and the non-display area NDA.

On the black matrix BM and the color filter CF, a planarization layer FL may be arranged. The planarization layer FL may be an insulating layer, and may planarize the upper surfaces of the black matrix BM and the color filter CF.

On the planarization layer FL, a pixel electrode PE may be arranged. In an embodiment, the pixel electrode may include or be formed of a transparent conductor, such as indium tin oxide ("ITO") or indium zinc oxide ("IZO"), or a reflective conductive material, such as aluminum.

In an embodiment, the pixel electrode PE and the connection electrode CE of the non-display area NDA may include or be formed of substantially the same material. That is, in an embodiment of a method of manufacturing a display device, the connection electrode CE and the pixel electrode PE may be simultaneously formed from a same material layer in a same process.

On the pixel electrode PE, a supporter SU may be arranged. The supporter SU may partition a plurality of spaces on the pixel electrode PE. That is, an upper portion and a lower portion of the supporter SU are spaced apart from each other, and a space provided in plurality may be formed between the upper and lower portions. Hereinafter, the space may be called a cavity CV.

A liquid crystal molecule LC may be provided in plurality arranged in one cavity CV. That is, in the cavity CV, a liquid crystal layer LCL in which a plurality of liquid crystal molecules LC are arranged may be disposed.

On an upper portion of the supporter SU, a common electrode COM may be arranged. In an embodiment, the common electrode COM may be a non-patterned front electrode. That is, the common electrode COM may be arranged as a whole plate shape (e.g., non-patterned).

A common voltage may be applied to the common electrode COM. If different voltages are applied to the common electrode COM and the pixel electrode PE, a constant electric field may be formed between the common electrode COM and the pixel electrode PE at the liquid crystal layer LCL. The liquid crystal molecules LC may be controlled by the electric field that is formed between the common electrode COM and the pixel electrode P. By controlling movement of the liquid crystal molecules LC that are arranged in the liquid crystal layer LCL, control of light that is necessary for the display device to display an image is possible.

In an embodiment, the common electrode COM in the display area DA may include or be formed of a material that is substantially the same as the material of the metal patterns MP1, MP2 and MP3 of the non-display area NDA. That is, in an embodiment, the common electrode COM in the display area DA and the metal patterns MP1, MP2 and MP3 in the non-display area NDA may be simultaneously formed in the same process, such as from a same material layer.

On the common electrode COM, the encapsulation layer EN may be arranged. The encapsulation layer EN may include or be made of an insulating material, and can be substituted for a separate upper substrate of a conventional liquid crystal display which already includes a lower substrate.

Hereinafter, an embodiment of a method for manufacturing a display device according to the invention will be described. Parts of the configuration to be described hereinafter may be the same as the configuration of the liquid crystal display according to some embodiments of the invention as described above, and to avoid duplicate explanation, explanation of the parts of the configuration will be omitted.

FIGS. 8 to 12 are cross-sectional views of embodiments of processes for explaining a method for manufacturing a display device according to the invention. The views of FIGS. 8 to 12 are taken similarly to that of FIG. 2.

Referring to FIGS. 8 to 12, an embodiment of a method for manufacturing a display device according to the invention includes preparing a first substrate 500 including a display area DA and a non-display area NDA; arranging on the first substrate 500 a first gate signal line GSL1 in the non-display area NDA, a first interlayer insulating layer IL1 on the first gate signal line GSL1, a second gate signal line GSL2 on the first interlayer insulating layer IL1, and a second interlayer insulating layer IL2 on the second gate signal line GSL2; forming a connection electrode CE that connects the first gate signal line GSL1 and the second gate signal line GSL2 to each other; and forming a static electricity prevention pattern EP1 arranged on the connection electrode CE and the second interlayer insulating layer IL2.

Figure 8:
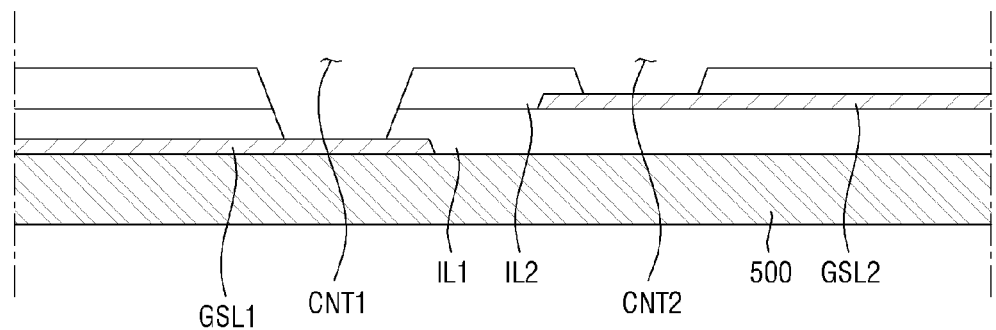
FIG. 8 is a cross-sectional view of an embodiment of a method for manufacturing a display device according to the invention.

First, referring to FIG. 8, the first substrate 500, which includes the display area DA and the non-display area NDA, the first gate signal line GSL1 arranged on the non-display area NDA, the first interlayer insulating layer IL1 arranged on the first gate signal line GSL1, the second gate signal line GSL2 arranged on the first interlayer insulating layer IL1, and the second interlayer insulating layer IL2 arranged on the second gate signal line GSL2, are prepared. The first substrate 500, the first gate signal line GSL1, the first interlayer insulating layer IL1, the second gate signal line GSL2, and the second interlayer insulating layer IL2 may be substantially the same as those of one or more embodiment of the display device according to the invention as described above, and thus the detailed explanation thereof will be omitted (see the description with reference to FIG. 2).

Figure 9:
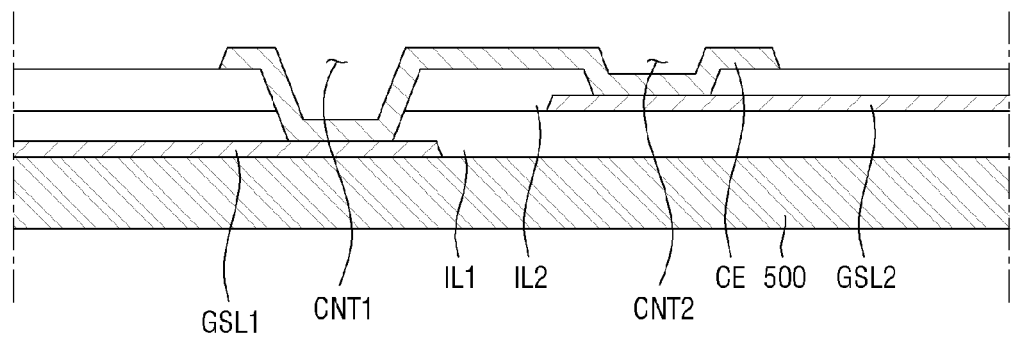
FIG. 9 is a cross-sectional view of another embodiment of a method for manufacturing a display device according to the invention.

Referring to FIG. 9, a connection electrode CE for connecting the first gate signal line GSL1 and the second gate signal line GSL2 to each other is formed on the second interlayer insulating layer IL2. Before the connection electrode CE for connecting the first gate signal line GSL1 and the second gate signal line GSL2 to each other is formed on the second interlayer insulating layer IL2, a first contact hole CNT1 that penetrates the first interlayer insulating layer IL1 and the second interlayer insulating layer IL2 to expose the first gate signal line GSL1 may be formed, and a second contact hole CNT2 that penetrates the second interlayer insulating layer IL2 to exposed the second gate signal line GSL2 may be formed.

That is, a first end of the connection electrode CE may be arranged on or in the first contact hole CNT1, and a second end thereof opposite to the first end may be arranged on or in the second contact hole CNT2. In other words, the first end of the connection electrode CE may come in contact with the first gate signal line GSL1 at the first contact hole CNT1, and the second end thereof may come in contact with the second gate signal line GSL2 at the second contact hole CNT2.

Figure 10:
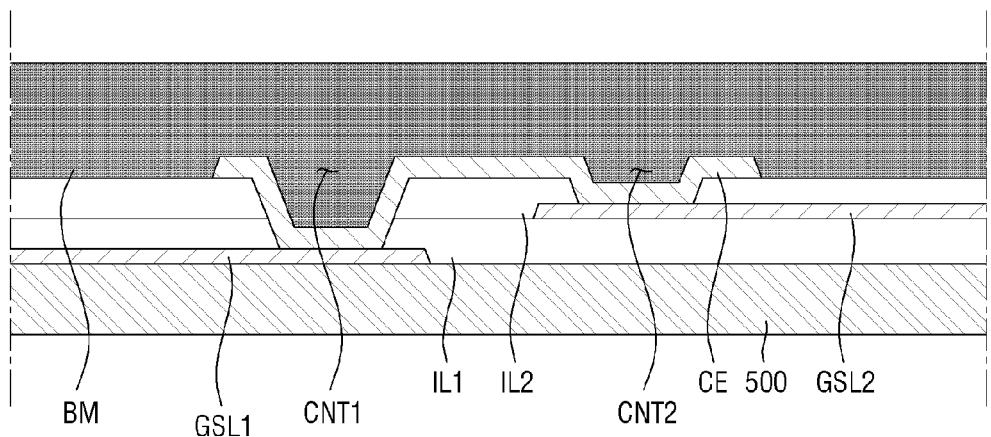
FIG. 10 is a cross-sectional view of still another embodiment of a method for manufacturing a display device according to the invention.

Referring to FIG. 10, a black matrix BM may be formed on the connection electrode CE and the second interlayer insulating layer IL2. The black matrix BM may be the same as that of one or more embodiment of the display device according to the invention as described above, and thus the detailed explanation thereof will be omitted.

Figure 11:
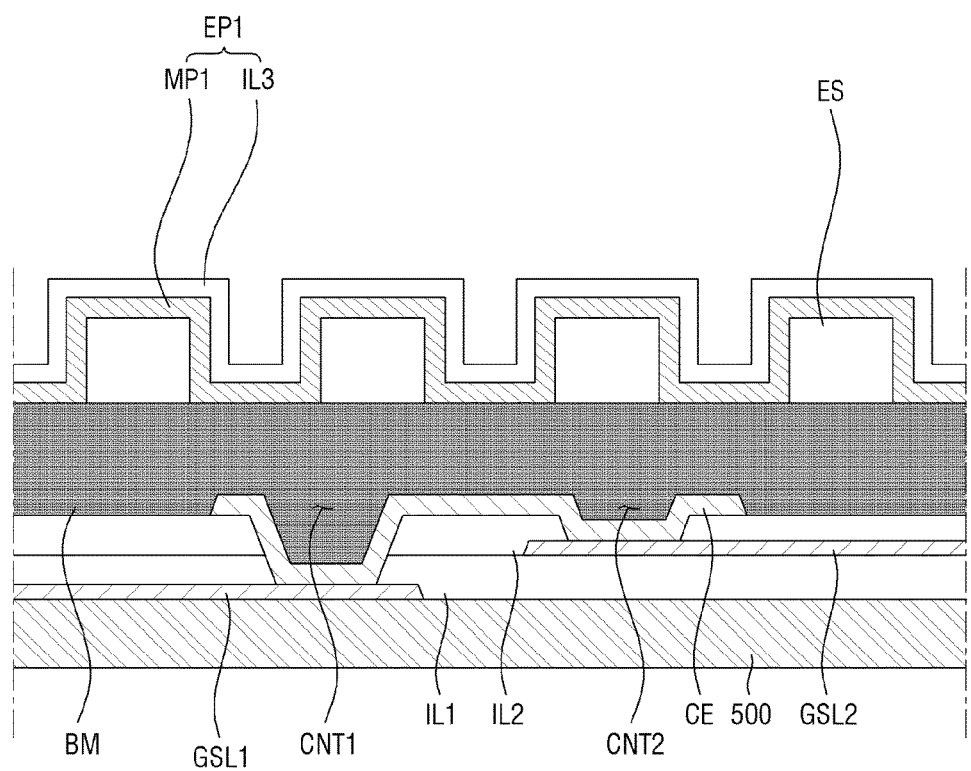
FIG. 11 is a cross-sectional view of yet another embodiment of a method for manufacturing a display device according to the invention.

Referring to FIG. 11, a static electricity prevention pattern such as EP1 (refer to FIG. 2) is formed on the connection electrode CE and the second interlayer insulating layer IL2. The static electricity prevention pattern may be the same as that of one or more embodiment of the display device according to the invention as described above. That is, the static electricity prevention pattern may be formed through selection of any one of the static electricity prevention patterns as described above with reference to FIGS. 2, 5 and 6.

That is, FIG. 11 exemplifies a case where the first static electricity prevention pattern EP1 of FIG. 2 is formed, but the invention is not limited thereto.

Figure 12:
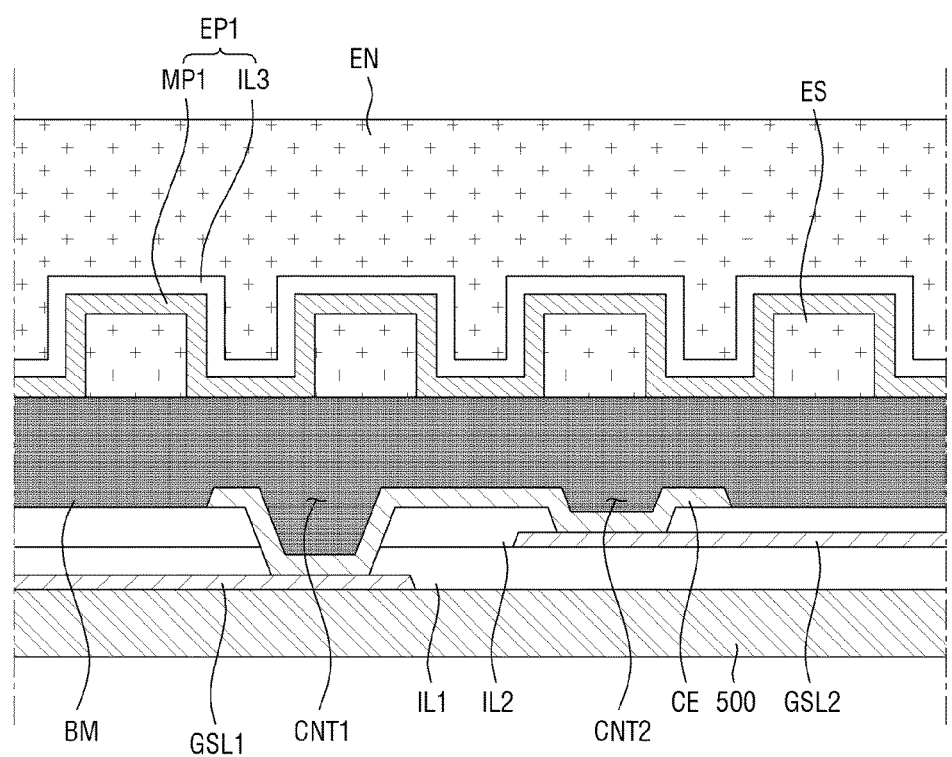
FIG. 12 is a cross-sectional view of yet another embodiment of a method for manufacturing a display device according to the invention.

Referring to FIG. 12, an encapsulation layer EN may be formed on the static electricity prevention pattern EP1. As described above, according to one or more embodiment of the display device according to the invention, the upper substrate of a conventional display device may be replaced by the encapsulation layer EN. Accordingly, the encapsulation layer EN may be arranged on the static electricity prevention pattern EP1. That is the encapsulation layer EN of the display area DA may extend from the display area DA and into the non-display area NDA to be in contact with the static electricity prevention pattern EP1 in the non-display area NDA.

The above effects of the invention are not restricted to the ones set forth herein. The above and other effects of the invention will become more apparent to one of daily skill in the art to which the invention pertains by referencing the claims.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display device comprising:
   a first substrate including a display area and a non-display area which is outside the display area;
   a first gate signal line and a second gate signal line each on the non-display area of the first substrate, the first gate signal line and the second gate signal line being in different layers;
   a connection electrode which is on the non-display area of the first substrate and connects the first gate signal line and the second gate signal line to each other;
   a static electricity prevention pattern which is on the non-display area of the first substrate and on the connection electrode; and
   a black matrix disposed between the connection electrode and the static electricity prevention pattern in a thickness direction of the first substrate, a portion of the black matrix overlapping the connection electrode,
   wherein the static electricity prevention pattern directly contacts the portion of the black matrix which overlaps the connection electrode.

2. The display device of claim 1, further comprising:
   a first interlayer insulating layer between the first gate signal line and the second gate signal line, and
   a second interlayer insulating layer on the second gate signal line.

3. The display device of claim 2, further comprising:
   a first contact hole which penetrates the first interlayer insulating layer and the second interlayer insulating layer to expose the first gate signal line; and
   a second contact hole which penetrates the second interlayer insulating layer to expose the second gate signal line,
   wherein a first end of the connection electrode contacts the first gate signal line at the first contact hole, and a second end of the connection electrode opposite to the first end thereof contacts the second gate signal line at the second contact hole.

4. The display device of claim 1, wherein the static electricity prevention pattern comprises:
   a first metal pattern including an upper portion,
   a lower portion below and spaced apart from the upper portion in the thickness direction of the first substrate by a predetermined distance, and
   a side portion which connects the upper portion and the lower portion to each other.

5. The display device of claim 4, wherein
   the static electricity prevention pattern is provided in plurality, and
   the lower portion of a first static electricity prevention pattern contacts the lower portion of a second static electricity prevention pattern adjacent to the first static electricity prevention pattern.

6. The display device of claim 4, wherein a predetermined space is formed between the upper portion and the lower portion of the first metal pattern which are spaced apart from each other in the thickness direction of the first substrate.

7. The display device of claim 6, further comprising an encapsulation layer on the static electricity prevention pattern,
   wherein the encapsulation layer fills the predetermined space between the upper portion and the lower portion of the first metal pattern.

8. The display device of claim 4, wherein
   the display area of the first substrate comprises a pixel electrode, a common electrode which is on the pixel electrode and forms an electric field therewith, and an encapsulation layer on the common electrode,
   wherein the first metal pattern comprises a same material as the common electrode.

9. The display device of claim 1, wherein
   the black matrix is at an edge of the non-display area,
   the non-display area of the first substrate comprises a metal layer on the black matrix, and
   the metal layer in the non-display area comprises a same material as the first metal pattern in the non-display area.

10. The display device of claim 1, wherein
    the static electricity prevention pattern is provided in plurality and comprises first metal patterns spaced apart from each other by a predetermined distance in a top plan view.

11. The display device of claim 10, wherein the plurality of static electricity prevention patterns further comprises a second metal pattern between the first metal patterns in the top plan view, the second metal pattern insulated from the first metal patterns.

12. The display device of clam 11, wherein the second metal pattern overlaps the connection electrode.

13. The display device of claim 10, wherein the first metal patterns spaced apart from each other do not overlap the connection electrode.

14. A method for manufacturing a display device, comprising:
    preparing a first substrate including a display area and a non-display area,
    the non-display area of the first substrate including a first gate signal line, a first interlayer insulating layer on the first gate signal line, a second gate signal line on the first interlayer insulating layer, and a second interlayer insulating layer on the second gate signal line;
    forming on the non-display area of the first substrate, a connection electrode which connects the first gate signal line and the second gate signal line to each other;
    forming on the non-display area of the first substrate, a static electricity prevention pattern on the connection electrode and the second interlayer insulating layer; and
    forming a black matrix disposed between the connection electrode and the static electricity prevention pattern in a thickness direction of the first substrate, a portion of the black matrix overlapping the connection electrode,
    wherein the static electricity prevention pattern directly contacts the portion of the black matrix which overlaps the connection electrode.

15. The method of claim 14, further comprising:
    forming on the non-display area of the first substrate, a first contact hole which penetrates the first interlayer insulating layer and the second interlayer insulating layer to expose the first gate signal line; and forming on the non-display area of the first substrate, a second contact hole which penetrates the second interlayer insulating layer to expose the second gate signal line.

16. The method of claim 14, wherein the static electricity prevention pattern comprises a first metal pattern including:
an upper portion,
a lower portion below and spaced apart from the upper portion in the thickness direction of the first substrate by a predetermined distance, and
a side portion which connects the upper portion and the lower portion to each other.

17. The method of claim 16, wherein
the static electricity prevention pattern is provided in plurality on the non-display area of the first substrate, and
the lower portion of a first static electricity prevention pattern contacts the lower portion of a second static electricity prevention pattern adjacent to the first static electricity prevention pattern.

18. The method of claim 16, wherein a predetermined space is formed between the upper portion and the lower portion of the first metal pattern which are spaced apart from each other in the thickness direction of the first substrate.

\* \* \* \* \*